Patented June 21, 1932

1,864,196

UNITED STATES PATENT OFFICE

WILLY O. HERRMANN AND ERICH BAUM, OF MUNICH, GERMANY, ASSIGNORS TO CONSORTIUM FUR ELEKTROCHEMISCHE INDUSTRIE, OF MUNICH, GERMANY

PROCESS FOR THE PREPARATION OF ACETYLENE AND ETHYLENE

No Drawing. Application filed April 14, 1928, Serial No. 270,148, and in Germany April 16, 1927.

We have found that chemical reactions involving organic substances can be carried out by means of a flame within the body of an organic liquid. By organic liquid is here included in addition to those materials which are liquid at ordinary temperature, all organic substances capable of being maintained as a liquid by any method such as fushion or application of pressure, etc.

In practising our invention, we can produce this flame by a number of methods. For example, a mixture of a combustible gas or a vaporized or pulverized fuel with substances such as oxygen, oxygen compounds, gases containing oxygen, chlorine, etc. which support combustion, is brought to the temperature of combustion at a point under the surface of the liquid or melt.

The combustible mixture may be produced at the place or before reaching the place where combustion is to occur. Thus, in the case of hydrogen and oxygen, mixing of the gases could only be produced safely at the point of combustion within the organic liquid. Such mixtures as are not explosive at ordinary temperatures can be mixed outside of the liquid and led into it through the same pipe.

According to our invention we produce a flame as described above, and when the temperature at the mouth of the burner or jet has increased to that at which combustion of the organic liquid takes place in the presence of gases or vapors such as oxygen, chlorine, etc., these oxidizing gases or vapors alone are then fed into the zone of combustion. In this manner the flame is maintained by the combustion of the organic liquid itself.

Hydrocarbons, carbon monoxide, etc., or mixtures of the same, such as occur frequently in technical processes, may be used with oxygen, chlorine, etc., in producing the flame. Due to their high heat of combustion, hydrogen or methane are often of special advantage. Carbon monoxide is particularly well suited for use when carrying out reactions in which it is desired to exclude water, since it produces no water. The gas or vapor used for producing a flame may in some cases, be supplied at the point of combustion in amounts in excess of what is needed for that purpose, and the excess caused to react with other substances present, such as the organic liquid itself. The oxygen, chlorine, or other gas used for supporting combustion and producing a flame may also be supplied in excess, and this excess used for oxidizing other substances than the material it is originally mixed with.

We wish it understood that our invention, due to the many variations possible, can be practised in such manner that the particular reaction desired can be made to take place either between the materials introduced within the liquid for the purpose of producing a flame or between constituents of the organic liquid; or finally, between materials in the flame and the organic liquid or some of its constituents.

We have also found that reactions carried out by our process may in many cases give more than ordinary yields by having catalysts present. The catalytic material may, for example, be dissolved or suspended in the organic liquid or may be material used in the construction of the burner from which the flame is produced.

We have found that our invention is suited to the production of unsaturated hydrocarbons, such as ethylene and acetylene, from petroleum or petroleum distillation fractions and the like. In addition to ethylene and acetylene, other liquid and gaseous products are produced due to the cracking of the petroleum by the heat liberated by the flame. The cracking reactions along with those producing ethylene and acetylene are especially pronounced when catalytic materials are used in the liquid or in the burner construction as described above. This is further shown in the examples given below. The ethylene or acetylene can be isolated from the reaction gas by any known method and then used in reactions involving ethylene or acetylene. Or the reaction gases may be used directly in such reactions.

The following examples are given here merely to illustrate a few of the many applications of our invention.

*Example I.*—A quartz burner from which a mixture of hydrogen and oxygen were burned under petroleum was heated to the temperature at which the petroleum would react with oxygen alone. Then the flow of hydrogen was stopped and the flame maintained by 150 liters of oxygen alone per hour. The hourly production under these conditions was 360 liters of a gas containing 6.4% ethylene and 4.4% acetylene. The remaining gases consisted of 12 per cent by volume of carbondioxide, 40 per cent by volume of carbonmonoxide, 9 per cent by volume of methane, 28 per cent by volume of hydrogen.

*Example II.*—Operating as in Example I, but with the flame maintained by a flow of 360 liters of oxygen per hour and the petroleum replaced by alcohol, a production of 1200 liters of gas containing 2.7% ethylene and 2.9% acetylene by volume per hour was obtained. The remaining gases consisted of 10 per cent by volume of carbondioxide, 37 per cent by volume of carbonmonoxide, 6 per cent by volume of methane, 41 per cent by volume of hydrogen.

What we claim is:

1. Process for the preparation of ethylene and acetylene which comprises producing a flame, by burning a combustible gas with oxygen, within an organic liquid, stopping the flow of combustible gas when the temperature of said liquid in the region near the flame is sufficient to enable the liquid to burn with oxygen alone and thereafter maintaining the flame within the liquid by continuing the flow of oxygen.

2. Process for the preparation of ethylene and acetylene which comprises producing a flame, by burning a combustible gas with oxygen, within petroleum, stopping the flow of combustible gas when the temperature of said petroleum in the region near the flame is sufficient to enable the petroleum to burn with oxygen alone and thereafter maintaining the flame within the petroleum by continuing the flow of oxygen.

Signed at Munich, Bavaria, Germany, this 28th day of March, A. D. 1928.

WILLY O. HERRMANN.
ERICH BAUM.